(12) United States Patent
Owen et al.

(10) Patent No.: US 7,069,462 B2
(45) Date of Patent: Jun. 27, 2006

(54) OPERATION MODE SCHEDULING

(75) Inventors: Kevin A. Owen, Meridian, ID (US);
Andrew Alegria, Nampa, ID (US);
Brett Smith, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 445 days.

(21) Appl. No.: 10/449,274

(22) Filed: May 30, 2003

(65) Prior Publication Data

US 2004/0243865 A1  Dec. 2, 2004

(51) Int. Cl.
*G06F 1/04* (2006.01)
(52) U.S. Cl. .................. 713/502; 713/500; 713/502; 713/300
(58) Field of Classification Search ............... 713/300, 713/500, 502
See application file for complete search history.

(56) References Cited

U.S. PATENT DOCUMENTS

| | | | | |
|---|---|---|---|---|
| 5,163,124 A | * | 11/1992 | Yabe et al. | 713/324 |
| 5,974,552 A | * | 10/1999 | Lim et al. | 713/300 |
| 6,408,395 B1 | * | 6/2002 | Sugahara et al. | 713/310 |
| 6,507,273 B1 | * | 1/2003 | Chang et al. | 340/3.1 |
| 2003/0009705 A1 | * | 1/2003 | Thelander et al. | 713/340 |

* cited by examiner

*Primary Examiner*—Thomas Lee
*Assistant Examiner*—Sean Weinman

(57) ABSTRACT

Scheduling operation modes of a managed device. A method embodiment of the present invention includes providing a device remote from the managed device with an interface enabling selection of options for scheduling the occurrence of operation modes for the managed device. Options selected through the interface are received from the remote device. The occurrence of operation modes of the managed device are then scheduled according to received options.

30 Claims, 8 Drawing Sheets

| Su | Mo | Tu | We | Th | Fr | Sa |
|---|---|---|---|---|---|---|
| NA | 0800 | 0800 | 0800 | 0800 | 0800 | NA |
| NA | 1700 | 1700 | 1700 | 1700 | 1700 | NA |

OPERATION MODE SCHEDULING

BACKGROUND

This invention relates to controlling the various operation modes of a computer or computer peripheral. More particularly, the invention is directed to preventing a computer or computer peripheral from entering an off-line mode during time of expected activity.

Computers and computer peripherals such as laptops, printers and scanners have various operation modes. A device may be "on-line" and ready to use, or a device may be "off-line" and not immediately available. For example, in an on-line mode a printer is at full power either waiting for instructions to print a document or busy printing. In an off-line mode, the printer may be turned off, powered down in a "stand-by" or "suspend" mode. A common reason for placing device in an off-line operation mode is to conserve power. Placing a device in an off-line mode also allows the device to perform a maintenance function. For example, a printer may perform tasks that improve image quality and alignment.

It is common for computers and computer peripherals to automatically switch off-line. After fifteen minutes of inactivity, for example, a computer may turn off its monitor or hard drive. A printer may automatically power down. A scanner may turn off its lamp. After a measured amount of use, a printer may perform a maintenance function.

In a busy office environment it is often desirable if not essential that a device be immediately available for use. Imagine being late for a meeting and needing one more color copy of a presentation. Unfortunately, the device being used to print the copy has automatically switched off-line to a suspend mode. To bring the printer on-line takes time. In many cases, the device must first warm up and self calibrate. For some color printers this can cause a considerable delay.

DETAILED DESCRIPTION

Computers and peripherals are often designed to automatically switch off-line to conserve power or to perform maintenance functions. The criteria used by these devices to determine when to switch offline typically includes measuring specified duration of inactivity or measuring an amount of use such as the number of pages printed or hours of operation. While these criteria work for the most part, they can cause undesirable and sometimes detrimental delays when a device is not available for immediate use. Various embodiments of the present invention will allow a user to schedule times when a device is to be prevented from entering an off-line mode.

Figure 1:
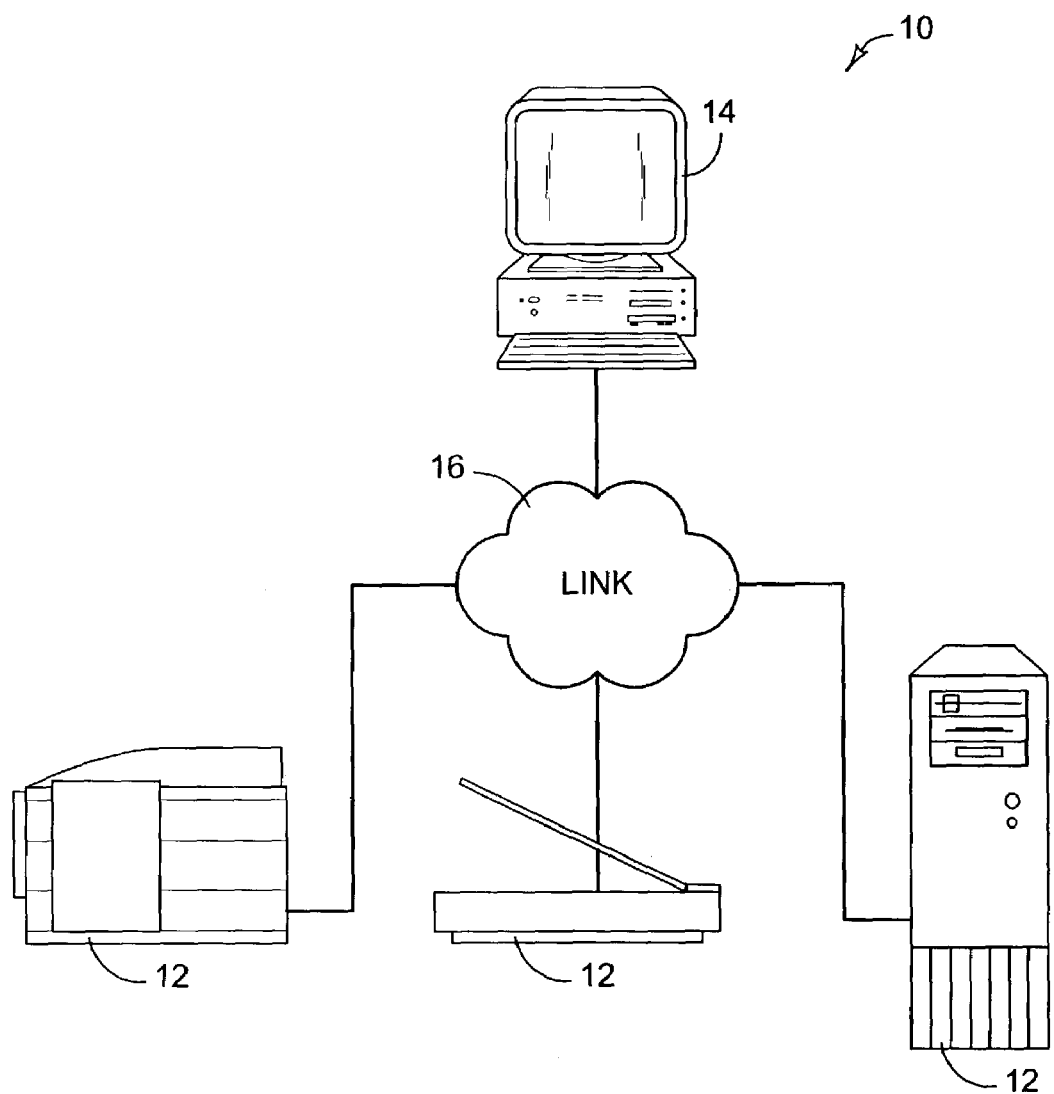
FIG. 1 is a schematic representation of an environment in which embodiments of the present invention may be implemented.

ENVIRONMENT: FIG. 1 illustrates an environment 10 in which it would be advantageous to implement embodiments of the present invention. Environment 10 includes managed devices 12 and computer 14 joined by link 16. Managed devices 12 represent generally any computing device or peripheral capable of switching between an on-line mode and an off-line mode. The term "on-line mode" refers to a state in which a device is either performing or immediately ready to perform a function for which the device was designed. For example, when a printer is powered up and waiting for printing instructions or it is busy printing, the printer is in an on-line mode. The term "off-line mode" refers to a state in which a device is unavailable and not busy performing a function for which the device was designed. For example, when a printer is off-line, it may be powered down in a suspend or stand-by mode, or it may be performing a self-maintenance function.

Computer 14 represents generally any computing device capable of communicating with managed devices 12. Link 16 represents generally any cable, wireless, or remote connection via a telecommunication link, an infrared link, a radio frequency link, and/or any other connector or system that provides electronic communication between computer 14 and managed devices 12. Link 16 may, for example, include the Internet.

Figure 2:
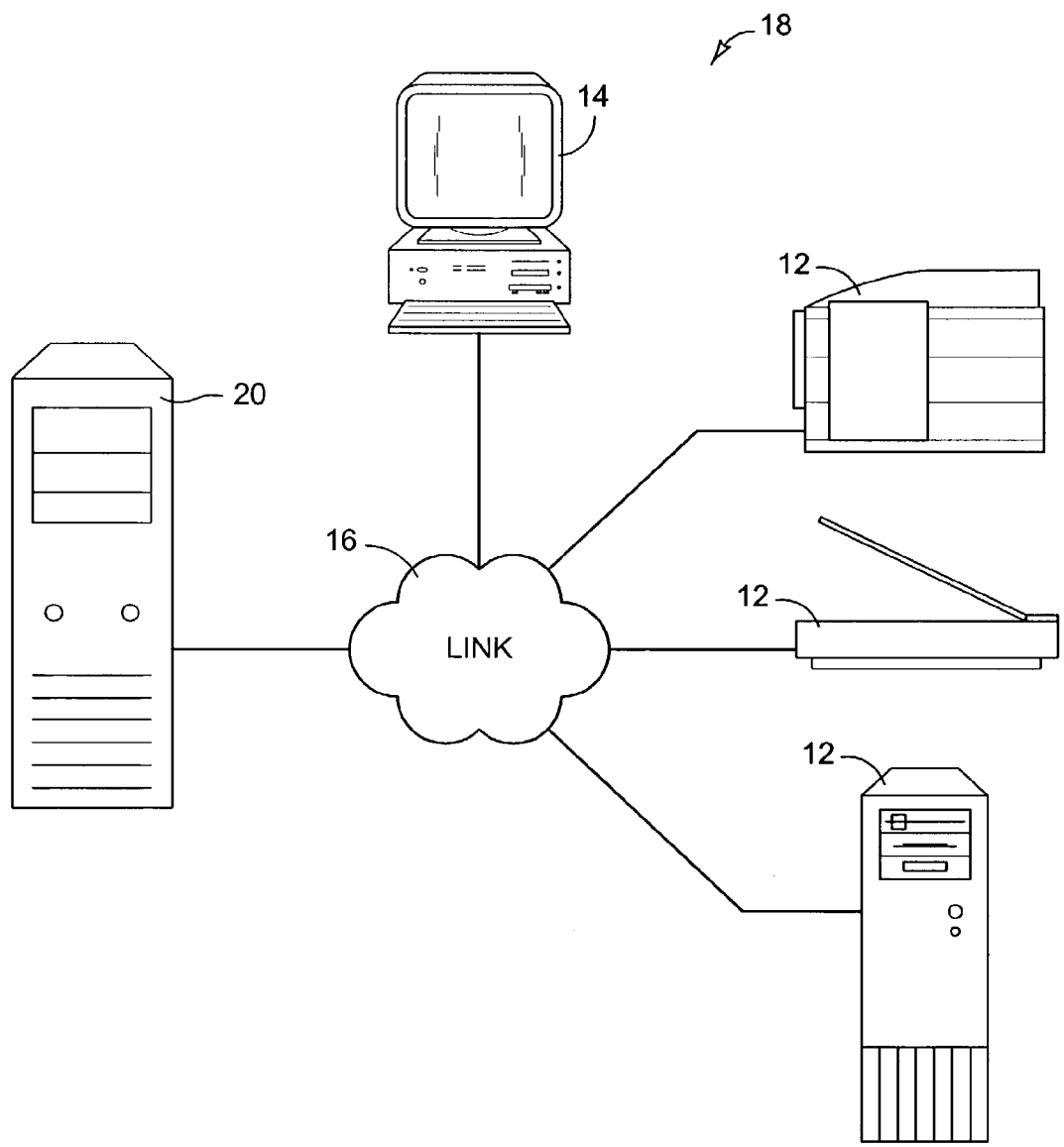
FIG. 2 is a schematic representation of another environment in which embodiments of the present invention may be implemented.

FIG. 2 illustrates a second environment 18 in which it would be advantageous to implement embodiments of the present invention. In addition to managed devices 12 and computer 14, environment 18 includes device manager 20. Device manager 20 represents generally any computing device running programming capable of monitoring and configuring managed devices 12.

Figure 3:
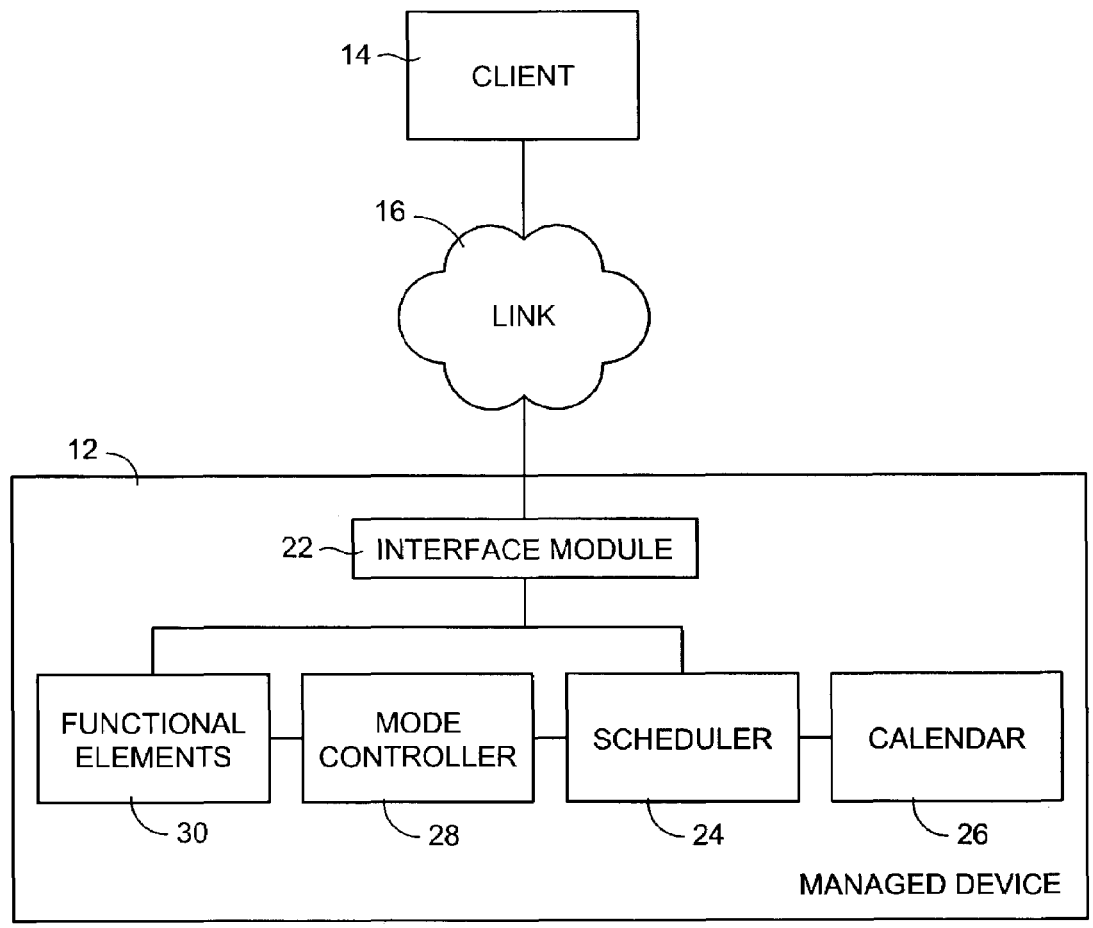
FIG. 3 is a block diagram of the environment of FIG. 1 illustrating the logical components of a managed device according to an embodiment of the present invention.

COMPONENTS: The logical components of one embodiment of the invention will now be described with reference to the block diagrams of FIGS. 3–5. FIGS. 2 and 3 illustrate embodiments implemented using environment 10 of FIG. 1. FIG. 5 illustrates an embodiment implemented using environment 18 of FIG. 2.

Starting with FIG. 3, managed device 12 includes interface module 22, scheduler 24, calendar 26, mode controller 28, and functional elements 30. Interface module 22 represents generally any programming capable of providing, to computer 14 over link 16, an interface for interacting with scheduler 24. Scheduler 24 represents any programming capable of scheduling the operation modes of managed device 12 according to selections made using an interface provided to computer 14. Calendar 26 represent generally any memory for storing calendar data. In particular, calendar data represents, at least in part, selections made through an interface provided to computer 14.

Mode controller 28 represents any combination of hardware and/or programming capable of setting the operation mode of functional elements 30 according to instructions received from scheduler 24. Functional elements 30 represent any combination of hardware and/or programming capable of performing the function or functions for which managed device 12 is intended. For example, where managed device 12 is a laser printer, its intended function is to print an image on a sheet of paper or other media. Functional elements 30, then, include a print engine and firmware capable of producing a printed image on a sheet of paper. Continuing with the example, mode controller 28 then is responsible for placing functional elements 30 in an off-line mode to conserve power an to perform maintenance functions. Mode controller 28 is also responsible for placing and keeping functional elements 30 in an on-line mode.

Interface module 22 may be implemented as a web server and scheduler 24 as a web service. Computer 14 will then include a web browser for interacting with interface module 22. A web server is a server that implements HTTP (Hypertext Transport Protocol). A web server can host a web site or a web service. A web site provides a user interface by supplying web pages to a requesting client, in this case a web browser. Web pages can be delivered in a number of formats including, but not limited to, HTML (Hyper-Text Markup Language) and XML (extensible Markup Language). Web pages may be generated on demand using server side scripting technologies including, but not limited to, ASP (Active Server Pages) and JSP (Java Server Pages). A web page is typically accessed through a network address. The network address can take the form of an URL (Uniform Resource Locator), IP (Internet Protocol) address, or any other unique addressing mechanism. A web service provides a programmatic interface which may be exposed using a variety of protocols layered on top of HTTP, such as SOAP (Simple Object Access Protocol).

Figure 4:
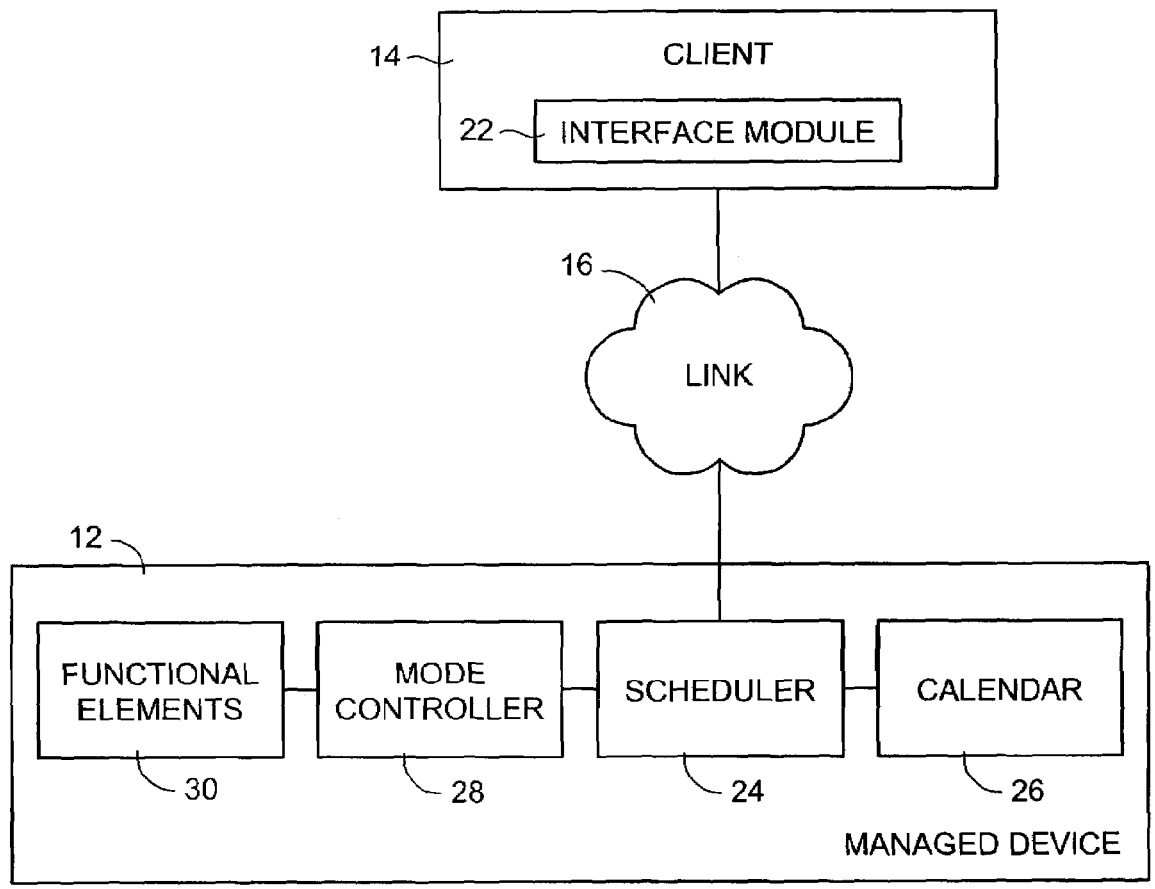
FIG. 4 is another block diagram of the environment of FIG. 1 illustrating the logical components of a managed device according to an embodiment of the present invention.
Figure 5:
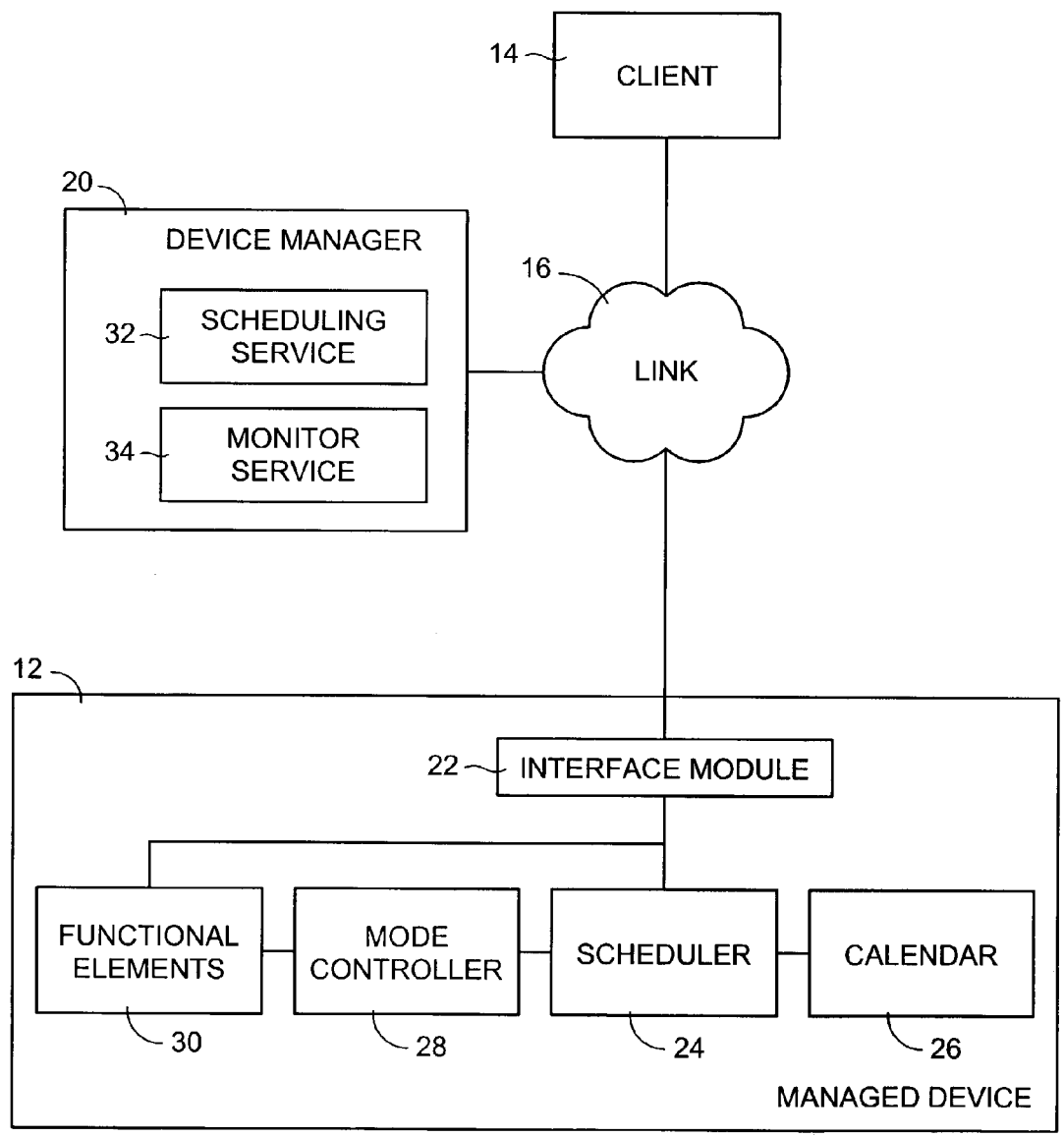
FIG. 5 is a block diagram on the environment of FIG. 2 illustrating the logical components of a managed device and a device manager according to an embodiment of the present invention.

Referring now to FIG. 4, interface module 22 is provided on computer 14. In this example, interface module 22 may be implemented as a component s of a driver for managed device 12. A driver is a program that controls a device. Every device, whether it be a printer, disk drive, or keyboard, must have a driver program. A driver acts like a translator between the device and programs that use the device. Each device has its own set of specialized commands that only its driver knows. In contrast, most programs access devices by using generic commands. The driver, therefore, accepts generic commands from a program and then translates them into specialized commands for the device. In this example, the driver stores scheduling selections made through an interface as colander data in calendar 26 on managed device 12. Scheduler 24 obtains the calendar data and instructs mode controller 28 accordingly.

FIG. 5 illustrates an embodiment implemented using environment 18 of FIG. 2. As shown, device manager 20 includes scheduling service 32 and monitor service 34. Interface module 22, operating on managed device 12, provides scheduling service 32 and monitor service 34 with a programmatic interface enabling services 32 and 34 to interact with scheduler 24 and functional elements 30. Scheduling service 32 represents any programming capable of opening a programmatic interface with scheduler 24 and communication through the opened interface to supply calendar data for calendar 26. Scheduling service 32 may open the interface by connecting to a network address established for interface module 22.

Monitor service 34 represents any programming capable of monitoring functional elements 30. More specifically, monitor service 34, through a programmatic interface provided by interface module 22, is responsible for detecting when functional elements 30 are on-line and in use and when functional elements 30 are off-line. Monitor service 34 is then responsible for identifying an operation mode pattern. An operation mode pattern is a pattern reflecting when a managed device 12 is usually on-line and off-line. For example, monitor service 34 may note that functional elements 30 are usually on-line a majority of the time Monday through Friday between 8 am and 5 pm. Monitor service 32 can then inform scheduling service 32 of this pattern. Scheduling service 32 can then send calendar data representing the pattern to scheduler 24.

Figures 6, 7:
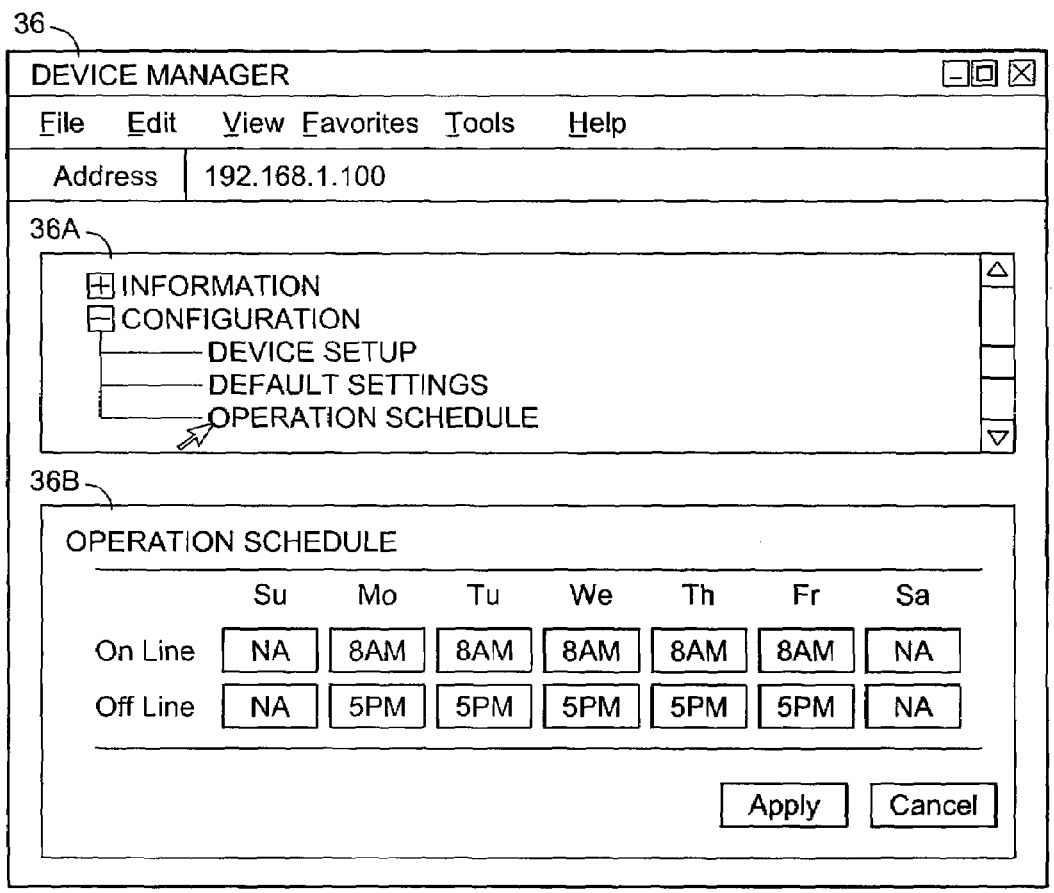
FIG. 6 is an exemplary screen view of a user interface for selecting scheduling options according to an embodiment of the present invention.
FIG. 7 is a table representing stored calendar data according to an embodiment of the present invention.

FIG. 6 illustrates a screen view of a user interface 36 for selecting scheduling options for managed device 12. In this example, interface 36 is a web page displayed by a browser. Interface 36 includes two sections 36A and 36B. Selecting "operation schedule" from section 36A causes interface module 22 to include controls for selecting scheduling options in section 36B. Through the controls included in section 36B, a user can, for each day of the week, specify when managed device 12 is to be placed and held in an on-line mode and when managed device 12 is to be placed in an off-line mode. In section 36B, the user has indicated that managed device 12 is to be held in an on-line mode between 8 am and 5 pm Monday through Friday. Saturday and Sunday have been set to "NA" indicating that on those days managed device is to be placed in on-line and off line modes by mode controller 28 without input from scheduler 24. For example, on Saturday and Sunday mode controller 28 may place functional elements 30 off-line after an identified period of inactivity. FIG. 7 illustrates table 38 representing calendar data stored in calendar 26. The entries in table 38 reflect a user's selections entered in section 36B of interface 36.

Figure 8:
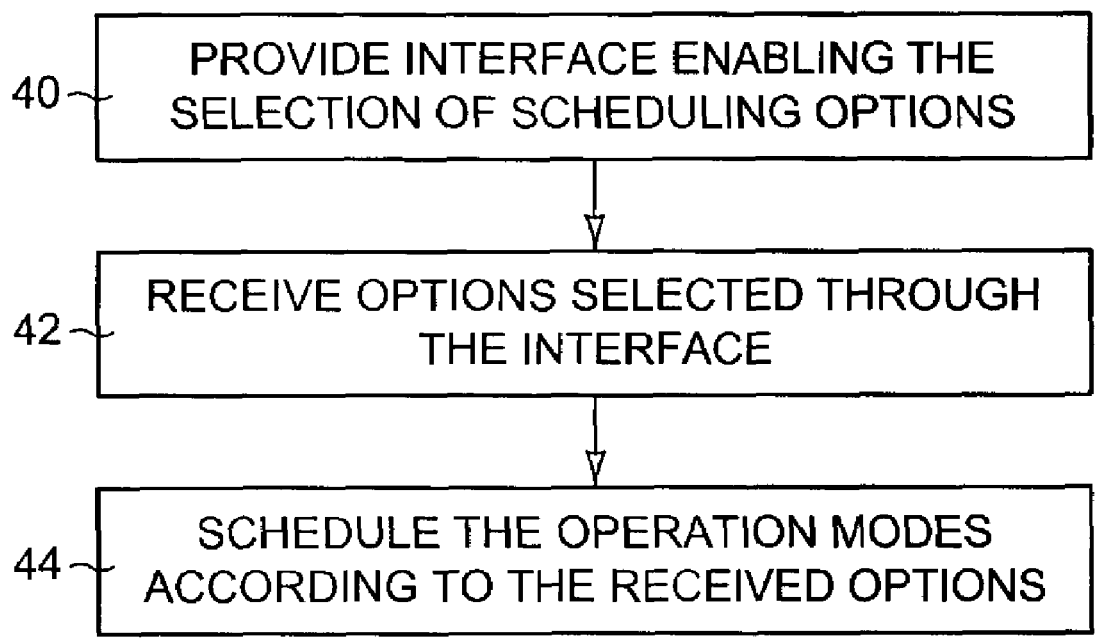
FIG. 8 is a flow diagram illustrating steps taken to schedule operation modes according to an embodiment of the present invention.

OPERATION: FIG. 8 is a flow diagram that helps to illustrate steps taken to schedule operation modes of a managed device 12. An interface enabling the selection of interface options is provided (step 40). Scheduling options entered through the interface are received by managed device 12 (step 42). The operation modes of managed device 12 are scheduled according to the received scheduling options (step 44).

With reference back to FIGS. 3–5, interface module 22 is responsible for performing step 40. The provided interface may be a user interface or a programmatic interface. Scheduler 42 is responsible for receiving scheduling options in step 42. Scheduler 24 saves the scheduling options as calendar data in calendar 26. Scheduler 24 is also responsible for scheduling operation modes in step 44.

With reference to FIG. 2, the interface provided in step 40 can be a web page provided in response to a user browsing to a network address established for managed device 12. The options received by scheduler 24 in step 42 are then selected by the user through the web page. With reference to FIG. 3, the interface provided in step 40 can be a dialog box provided by a driver for managed device 12. The options received by scheduler 24 in step 42 are selected by the user through the dialog box. With reference to FIG. 5, the interface provided in step 40 can be a programmatic interface provided in response to scheduling service 32 establishing a network connection with managed device 12 and opening the interface. The options received by scheduler 24 in step 42 are selected according to an operation mode pattern identified by monitor service 34.

Figure 9:
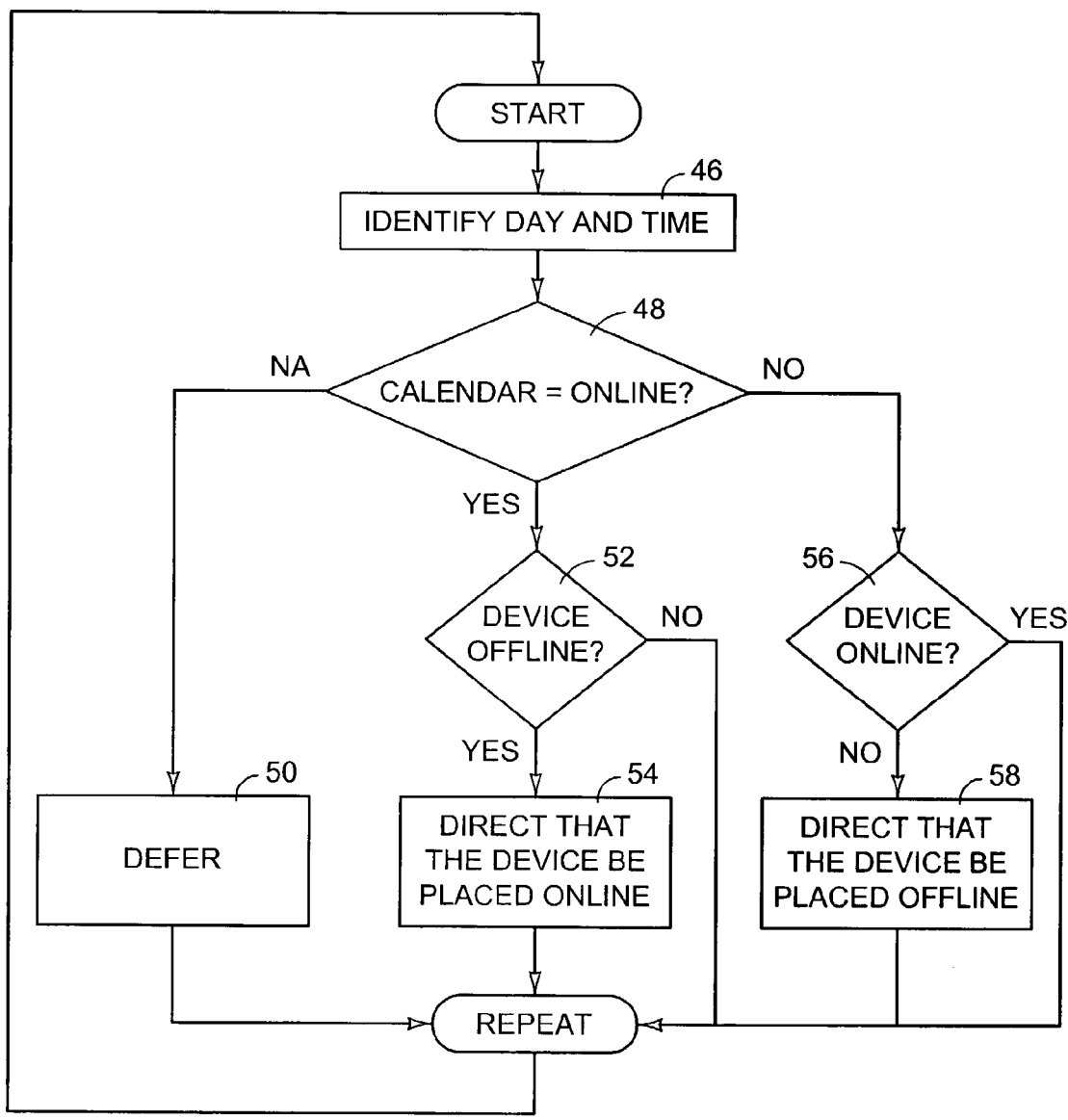
FIG. 9 is a flow diagram illustrating the scheduling step of FIG. 8 according to an embodiment of the present invention.

FIG. 9 is a flow diagram further illustrating scheduling step 44. Accessing a system clock, scheduler 24 identifies the current day and time (step 46). Scheduler 24 then determines whether, at the identified data and time, state machine 24 is to be placed on-line (step 48). To do so scheduler 24 accesses calendar 26 and reads calendar data. Referring to FIG. 7, the calendar data may indicate yes, no, or NA. If, for the identified day and time, NA is indicated, scheduler 24 takes no action and defers, letting mode controller 28 select operation modes without input from scheduler 24 (step 50).

If the calendar data indicates that managed device 12 is to be on-line, it is determined if managed device 12 is currently off-line (step 52). If managed device 12 is offline, scheduler 24 directs mode controller 28 to place managed device 12 on-line (step 54). In step 54, scheduler 24 may instruct mode controller 28 to prevent managed device 12 from going off-line for a set period of time. To carry out the instructions mode controller 28 may disable a power save mode and then re-enable the power save mode based on calendar data. If the calendar data indicates that managed device 12 is to be off-line, it is determined if managed device 12 is currently on-line (step 56). I managed device 12 is on-line, scheduler 24 directs mode manager to place managed device 12 off-line (step 58). The process periodically repeats with step 46.

CONCLUSION: The present invention can be embodied in any computer-readable media for use by or in connection with an instruction execution system such as a computer/processor based system or other system that can fetch or obtain the logic from the computer-readable media and execute the instructions contained therein. A "computer-readable media" can be any medium that can contain, store, or maintain programming for use by or in connection with the instruction execution system. The computer readable media can comprise any one of many physical media such as, for example, electronic, magnetic, optical, electromagnetic, infrared, or semiconductor media. More specific examples of a suitable computer-readable medium would include, but are not limited to, a portable magnetic computer diskette such as a floppy diskette or hard drive, a random access memory (RAM), a read-only memory (ROM), an erasable programmable read-only memory, a portable compact disc, or any combination thereof.

The present invention has been shown and described with reference to the foregoing exemplary embodiments. It is to be understood, however, that other forms, details, and embodiments may be made without departing from the spirit and scope of the invention which is defined in the following claims.

What is claimed is:

1. A method for scheduling operation modes of a managed device, comprising:
   providing a device remote from the managed device with an interface enabling selection of options for scheduling the occurrence of operation modes for the managed device;
   identifying an operation mode pattern for the managed device and, through the interface, selecting options according to the identified operation mode pattern;
   receiving from the remote device options selected through the interface; and
   scheduling the occurrence of operation modes of the managed device according to received options.

2. The method of claim 1, wherein providing comprises providing the device remote from the managed device with a user interface enabling a user of the remote device to select of options for scheduling the occurrence of operation modes for the managed device.

3. The method of claim 1, wherein providing comprises providing the device remote from the managed device with a programmatic interface enabling programming operating on the remote device to select options for scheduling the occurrence of operation modes for the managed device.

4. The method of claim 1, wherein scheduling includes scheduling, according to the received options, when the managed device is to be placed in an off-line mode, when the managed device is to be placed in an on-line mode, and when the managed device is to be prevented from entering the off-line mode.

5. A method comprising:
   providing a device remote from a managed device with an interface enabling selection of scheduling options;
   identifying an operation mode pattern for the managed device and, through the interface, selecting options according to the identified operation mode pattern;
   receiving from the remote device scheduling options selected through the interface;
   if indicated by the received scheduling options, directing that the managed device be placed in an off-line mode;
   if indicated by the received scheduling options, directing that the managed device be prevented from entering the off-line mode; and
   if indicated by the received scheduling options, directing that the managed device be placed in an on-line mode.

6. The method of claim 5, wherein providing comprises providing the device remote from the managed device with a user interface enabling a user of the remote device to select of options for scheduling the occurrence of operation modes for the managed device.

7. The method of claim 5, wherein providing comprises providing the device remote from the managed device with a programmatic interface enabling programming operating on the remote device to select options for scheduling the occurrence of operation modes for the managed device.

8. A method comprising:
   providing a device remote from a managed device with an interface enabling selection of options for scheduling when the managed device is to be prevented from entering a power save mode;
   identifying an operation mode pattern for the managed device and, through the interface, selecting options according to the identified operation mode pattern;
   receiving from the remote device options selected through the interface;
   directing that the managed device be prevented from entering the power save mode as indicated by options received from the remote device.

9. Computer readable media having instructions for:
   providing a device remote from a managed device with an interface enabling selection of options for scheduling the occurrence of operation modes for the managed device;
   identifying an operation mode pattern for the managed device and, through the interface, selecting options according to the identified operation mode pattern:
   receiving from the remote device options selected through the interface; and
   scheduling the occurrence of operation modes of the managed device according to received options.

10. The media of claim 9, wherein the instructions for providing include instructions for providing the device remote from the managed device with a user interface enabling a user of the remote device to select of options for scheduling the occurrence of operation modes for the managed device.

11. The media of claim 9, wherein the instructions for providing include instructions for providing the device remote from the managed device with a programmatic interface enabling programming operating on the remote device to select options for scheduling the occurrence of operation modes for the managed device.

12. The media of claim 9, wherein the instructions for scheduling include instructions for scheduling, according to the received options, when the managed device is to be placed in an off-line mode, when the managed device is to be placed in an on-line mode, and when the managed device is to be prevented from entering an the off-line mode.

13. Computer readable media having instructions for:
providing a device remote from a managed device with an interface enabling selection of scheduling options;
identifying an operation mode pattern for the managed device and, through the interface, selecting options according to the identified operation mode pattern;
receiving from the remote device scheduling options selected through the interface;
if indicated by the received scheduling options, directing that the managed device be placed in an off-line mode;
if indicated by the received scheduling options, directing that the managed device be prevented from entering the off-line mode; and
if indicated by the received scheduling options, directing that the managed device be placed in an on-line mode.

14. The media of claim 13, wherein the instructions for providing include instructions for providing the device remote from the managed device with a user interface enabling a user of the remote device to select of options for scheduling the occurrence of operation modes for the managed device.

15. The media of claim 13 wherein the instructions for providing include instructions for providing the device remote from the managed device with a programmatic interface enabling programming operating on the remote device to select options for scheduling the occurrence of operation modes for the managed device.

16. Computer readable media having instructions for:
providing a device remote from a managed device with an interface enabling selection of options for scheduling when the managed device is to be prevented from entering a power save mode;
identifying an operation mode pattern for the managed device and, through the interface, selecting options according to the identified operation mode pattern;
receiving from the remote device options selected through the interface;
directing that the managed device be prevented from entering the power save mode as indicated by options received from the remote device.

17. Computer readable media having instructions for:
identifying an operation mode pattern of a managed device;
opening an interface for selecting scheduling options for the managed device; and
selecting, according to the operation mode pattern, scheduling options through the interface.

18. A system for scheduling operation modes of a managed device, comprising:
an interface module operable to provide a device remote from the managed device with an interface enabling selection of options for scheduling the occurrence of operation modes for the managed device;
a monitor service operable to identify an operation mode pattern of the managed device; and
a scheduling service operable to, through the interface provided by the interface module, select options for scheduling the occurrence of operation modes for the managed device based upon the operation mode pattern identified by the monitor service; and
a scheduler operable to receive, options selected through the interface and to schedule the occurrence of operation modes of the managed device according to received options.

19. The system of claim 18, wherein the interface module is further operable to provide the device remote from the managed device with a user interface enabling a user of the remote device to select of options for scheduling the occurrence of operation modes for the managed device.

20. The system of claim 18, wherein the interface module is further operable to provide the device remote from the managed device with a programmatic interface enabling programming operating on the remote device to select options for scheduling the occurrence of operation modes for the managed device.

21. The system of claim 18, wherein scheduler is further operable to schedule, according to the received options, when the managed device is to be placed in an off-line mode, when the managed device is to be placed in an on-line mode, and when the managed device is to be prevented from entering the off-line mode.

22. The system of claim 18, wherein the interface module and the scheduler are functional components of the managed device.

23. The system of claim 18, wherein the scheduler is a functional component of the managed device and the interface generator is not.

24. A system comprising:
an interface module operable to provide a device remote from the managed device with an interface enabling selection of options for scheduling the occurrence of operation modes for the managed device;
a monitor service operable to identify an operation mode pattern of the managed device; and
a scheduling service operable to, through the interface provided by the interface module, select options for scheduling the occurrence of operation modes for the managed device based upon the operation mode pattern identified by the monitor service; and
a scheduler operable to receive, at least indirectly, from the remote device options selected through the interface and, as indicated by the received scheduling options, to:
direct that the managed device be placed in an off-line mode;
direct that the managed device be prevented from entering the off-line mode; and
direct that the managed device be placed in an on-line mode.

25. The system of claim 24, wherein the interface module and the scheduler are functional components of the managed device.

26. The system of claim 24, therein the scheduler is a functional component of the managed device and the interface generator is not.

27. A system comprising:
an interface module operable to provide a device remote from the managed device with an interface enabling selection of options for scheduling the occurrence of operation modes for the managed device;
a monitor service operable to identify an operation modes pattern of the managed device; and
a scheduling service operable to, through the interface provided by the interface module, select options for scheduling the occurrence of operation modes for the managed device based upon the operation mode pattern identified by the monitor service; and a scheduler operable to receive, at least indirectly, from the remote device options selected through the interface and, as indicated by the received scheduling options, to direct that the managed device be prevented from entering a power save mode.

28. The system of claim 27, wherein the interface module and the scheduler are functional components of the managed device.

29. The system of claim 27, wherein the scheduler is a functional component of the managed device and the interface generator is not.

30. A system comprising:
   a means for providing a device remote from the managed device with an interface enabling selection of options for scheduling the occurrence of operation modes for the managed device;
   a means for identifying in an a operation mode pattern of the managed device;
   a means for selecting, through the interface provided by the interface module, options for scheduling the occurrence of operation modes for the managed device based upon the operation mode pattern;
   a means for receiving from the remote device options selected through the interface;
   a means for directing that the managed device be placed in an off-line mode as indicated by the received scheduling options;
   a means for directing that the managed device be prevented from entering the off-line mode as indicated by the received scheduling options; and
   a means for directing that the managed device be placed in an on-line mode as indicated by the received scheduling options.

* * * * *

UNITED STATES PATENT AND TRADEMARK OFFICE
CERTIFICATE OF CORRECTION

PATENT NO. : 7,069,462 B2  Page 1 of 1
APPLICATION NO. : 10/449274
DATED : June 27, 2006
INVENTOR(S) : Kevin A. Owen et al.

It is certified that error appears in the above-identified patent and that said Letters Patent is hereby corrected as shown below:

In column 6, line 54, in Claim 9, after "pattern" delete ":" and insert -- ; --, therefor.

In column 7, line 9, in Claim 12, after "entering" delete "an".

In column 7, line 31, in Claim 15, after "claim 13" insert -- , --.

In column 8, line 3, in Claim 18, delete "receive," and insert -- receive --, therefor.

In column 8, line 27, in Claim 23, delete "wherein" and insert -- therein --, therefor.

In column 8, line 63, in Claim 27, delete "modes" and insert -- mode --, therefor.

In column 10, line 1, in Claim 30, delete "in an a" and insert -- an --, therefor.

Signed and Sealed this

Third Day of March, 2009

JOHN DOLL
*Acting Director of the United States Patent and Trademark Office*